(12) United States Patent
Swartz et al.

(10) Patent No.: US 11,904,532 B2
(45) Date of Patent: Feb. 20, 2024

(54) CARBON FIBER SHEET SEPARATION WITH FLICKERS FOR 3-DIMENSIONAL PRINTING

(71) Applicant: Impossible Objects, Inc., Northbrook, IL (US)

(72) Inventors: Robert Swartz, Highland Park, IL (US); James Brough, Buffalo Grove, IL (US); Eugene Gore, Des Plaines, IL (US)

(73) Assignee: Impossible Objects, Inc., Northbrook, IL (US)

( * ) Notice: Subject to any disclaimer, the term of this patent is extended or adjusted under 35 U.S.C. 154(b) by 394 days.

(21) Appl. No.: 17/156,538

(22) Filed: Jan. 23, 2021

(65) Prior Publication Data
US 2021/0229347 A1    Jul. 29, 2021

Related U.S. Application Data

(60) Provisional application No. 62/965,079, filed on Jan. 23, 2020.

(51) Int. Cl.
| | |
|---|---|
| *B29C 64/147* | (2017.01) |
| *B29C 64/321* | (2017.01) |
| *B29C 64/314* | (2017.01) |
| *B29C 64/232* | (2017.01) |
| *B29C 64/245* | (2017.01) |
| *B33Y 30/00* | (2015.01) |
| *B33Y 10/00* | (2015.01) |

(52) U.S. Cl.
CPC .......... *B29C 64/147* (2017.08); *B29C 64/232* (2017.08); *B29C 64/245* (2017.08); *B29C 64/314* (2017.08); *B29C 64/321* (2017.08); *B33Y 10/00* (2014.12); *B33Y 30/00* (2014.12)

(58) Field of Classification Search
None
See application file for complete search history.

(56) References Cited

U.S. PATENT DOCUMENTS

| | | | |
|---|---|---|---|
| 9,393,770 B2 | 7/2016 | Swartz | |
| 9,776,376 B2 | 10/2017 | Swartz | |
| 9,827,754 B2 | 11/2017 | Swartz | |
| 9,833,949 B2 | 12/2017 | Swartz | |
| 10,046,552 B2 | 8/2018 | Swartz | |
| 10,252,487 B2 | 4/2019 | Swartz | |
| 10,350,877 B2 | 7/2019 | Swartz | |
| 10,377,080 B2 | 8/2019 | Swartz | |
| 10,377,106 B2 | 8/2019 | Swartz | |
| 10,384,437 B2 | 8/2019 | Swartz | |

(Continued)

*Primary Examiner* — Joel G Horning
(74) *Attorney, Agent, or Firm* — Dunlap Bennett & Ludwig, PLLC

(57) ABSTRACT

A system and method for lifting substrate sheets off of a stack of porous sheets one at a time, even though the sheets tend to stick together. A felt tamp is lowered onto the stack of sheets, and as the tamp is raised, a set of edge flickers create a downward force on the corners of the top sheet. This causes the edges of the top sheet to bend downward slightly just enough to pry the second sheet loose from the top sheet. The tamp can then be further raised with only the top sheet adhering to the felt, and the lifted sheet can be deposited at the next station in the process. Periodically, a brush is used to renew the surface of the felt to prevent matting of the felt fibers.

5 Claims, 5 Drawing Sheets

(56) References Cited

U.S. PATENT DOCUMENTS

| | | |
|---|---|---|
| 10,597,249 B2 | 3/2020 | Swartz |
| 10,751,987 B2 | 8/2020 | Swartz |
| 10,934,120 B2 | 3/2021 | Swartz |
| 2008/0012202 A1* | 1/2008 | Hubl ........................ B65H 3/10 700/1 |
| 2017/0151719 A1 | 6/2017 | Swartz |
| 2017/0274595 A1* | 9/2017 | Swartz .................. B29C 64/165 |
| 2017/0291223 A1 | 10/2017 | Swartz |
| 2018/0072001 A1 | 3/2018 | Swartz |
| 2018/0264725 A1 | 9/2018 | Swartz |
| 2018/0264732 A1 | 9/2018 | Swartz |
| 2019/0084046 A1 | 3/2019 | Swartz |
| 2019/0202164 A1 | 7/2019 | Swartz |
| 2019/0366626 A1 | 12/2019 | Swartz |
| 2020/0223131 A1 | 7/2020 | Swartz |
| 2020/0384783 A1 | 12/2020 | Swartz |

\* cited by examiner ction No. 62/965,079 filed Jan. 23, 2020. Application 62/965,079 as well as U.S. Pat. Nos. 9,393,770; 9,776,376; 9,827,754; 9,833,949; 10,046,552; 10,252,487; 10,377,080; 10,377,106; 10,384,437; 10,597,249 are hereby incorporated by reference in their entireties.

BACKGROUND

Field of the Invention

The present invention relates to 3-dimensional (3-D) printing and more particularly to 3-D printing on non-woven sheets.

Description of the Problem Solved

Composite-Based Additive Manufacturing (CBAM) is a process where sections of a 3-dimensional object are printed on substrate sheets (e.g., carbon fiber) section-by-section using an inkjet printer or lithographic techniques. The printing typically uses an aqueous ink solution, but in some embodiments, can use other solutions or inks. The substrates are then flooded with a powder that can be a thermoplastic material, thermoset metal or other powder. The powder adheres only to the wet (printed) portions of the substrate. Excess powder is removed from the sheets, and the sheets are stacked on top of one-another. The stack is typically compressed and heated causing the powder layers to fuse forming the 3-D object. Excess solid material can then be removed by abrasion, sand-blasting, chemical means or other removal technique.

One of the problems that had to be solved in making a machine to practice the CBAM process is feeding non-woven sheets of substrate material. As described in earlier applications and patents, conventional sheet feeding techniques of commonplace printers do not work. This is due to the fact that the sheets are porous, and conventional vacuum grippers tend to pick up multiple sheets because the sheets stick together. Thus, the material does not feed with a conventional roller feed mechanism. Further, missed or misprinted sheets are a serious problem, since the process cannot usually tolerate a missed or misprinted sheet. If a layer is defective, the manufacture of the object can fail, and this can happen due to single misprinted or unprinted sheet. For example, if a sheet sticks to the bottom of the current printed sheet, the unprinted layer will not stick to the print layer, and the part will fail, since the top half of the part will separate from the bottom half at the location of the sheet that that was unprinted.

The original version of the CBAM machine used die cut sheets that were interleaved, and a solenoid mechanism to separate the sheet, along with a dry erase felt to pick up the sheet. Die cutting the sheets and stacking them in an interleaved fashion is expensive, time consuming and is subject to error. Additionally, the sheets must be placed in the correct orientation when the sheet feeder is refilled.

SUMMARY OF THE INVENTION

The present invention relates to a system and method for lifting non-woven substrate sheets off of a stack of such sheets one at a time, even though the sheets tend to stick together. A felt tamp is lowered onto the stack of sheets. As the tamp is raised, a set of edge flickers create a downward force on the corners or edges of the top sheet (the sheet being lifted off the stack). A typical arrangement may have four edge flickers at the four corners of the sheets. The edge flickers cause the edges or corners of the top sheet to bend downward slightly as the sheet is raised just enough to pry the second sheet loose from the top sheet. The tamp can then be further raised with only the top sheet adhering to the felt, and the lifted sheet can be deposited at the next station in the process. Periodically, a brush is used to renew the surface of the felt to prevent matting of the felt fibers.

DESCRIPTION OF THE FIGURES

Attention is now directed to several Figures that illustrate features of the present invention.

Figure 1:
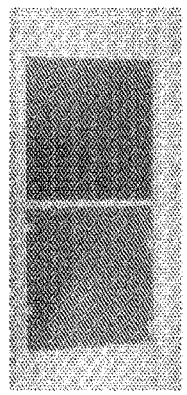
FIG. 1 shows an embodiment of the device with the felt tamper in a raised position.
Figure 1:
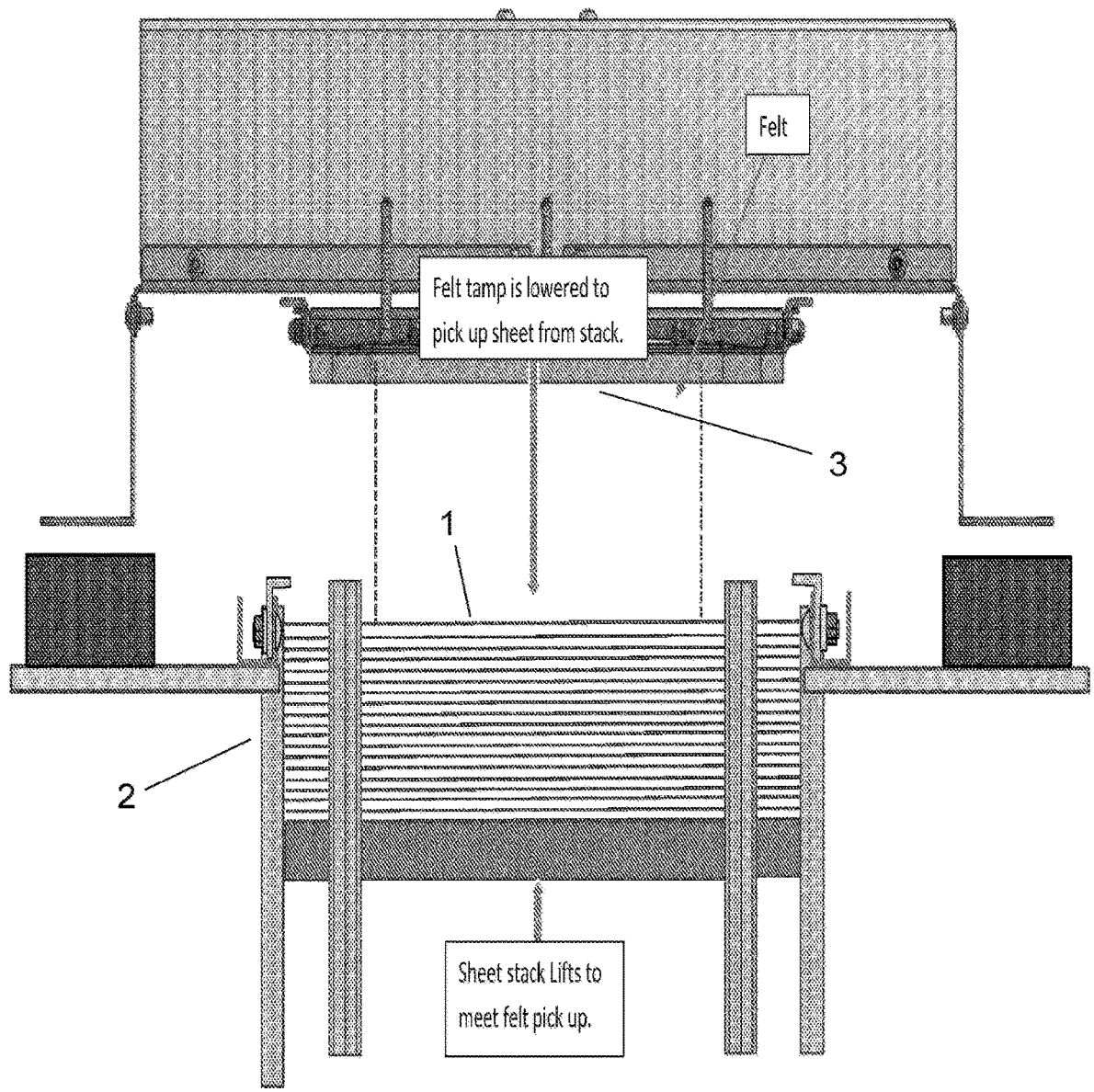

Several illustrations have been presented to aid in understanding the present invention. The scope of the present invention is not limited to what is shown in the figures.

DESCRIPTION OF THE PREFERRED EMBODIMENTS

What is described below and in the drawings is an improved sheet feeder that works with simple sheets; that is sheets that do not need to be die cut, and can be made on a conventional sheeter from a coil of substrate material at a low cost. The present invention allows for the use of non-precut sheets and solves the problem of the sheets sticking together.

Figure 2:
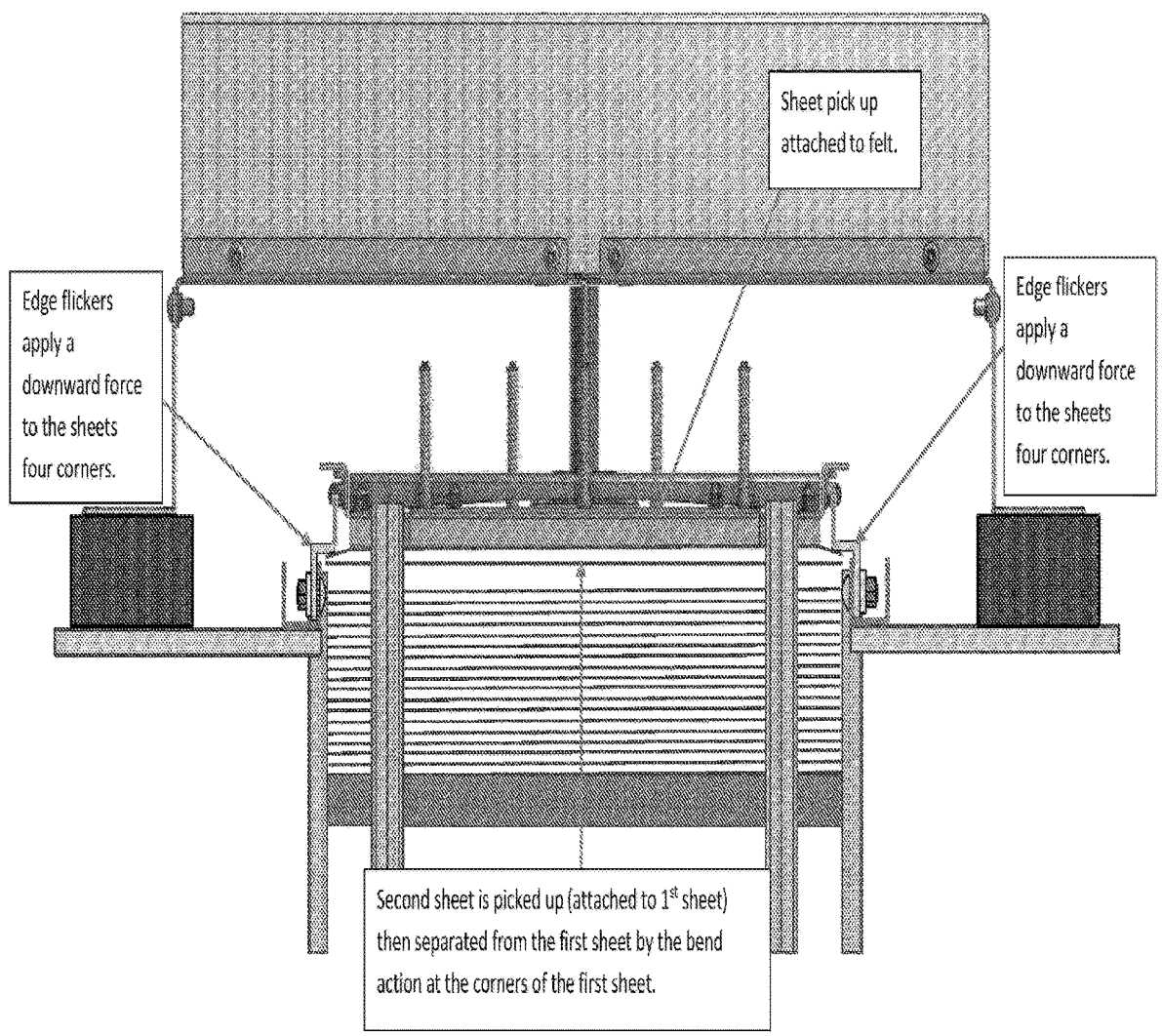
FIG. 2 shows the embodiment of FIG. 1 with the felt tamper in a lowered position.

FIGS. 1-2 show an embodiment of the present invention. A stack of substrate sheets 1 lies on a bed 2. A felt tamp 3 is lowered to pick up a sheet from the stack. FIG. 1 shows the tamp in the raised position, while FIG. 2 shows the tamp in the lowered position. As the tamp is lowered, the sheet stack is raised to meet the it. The felt then contacts the top sheet. Edge flickers, which are small protrusions, apply a downward force onto the stack of sheets at the four corners. The sheet to be picked up, is now attached to the felt, and the second sheet to be picked up is still attached to the first sheet through surface attraction. The second sheet is separated from the first sheet by the bend action at the corners of the first sheet. The first sheet picked up has a very high attraction to the felt while the flickers create a downward force that bends the corners of the sheet being picked up. The second or following sheet's attraction to the first sheet is much lower than the first sheet's attraction to the felt. This causes the second (or subsequent) sheet to detach from the first sheet thus preventing the pickup of both the first and second sheets simultaneously. The felt tamp can then be raised and moved to deliver the first sheet. After that, the tamp device returns for another sheet. In the depicted embodiment, the flickers are still as the tamp moves upward. Alternate embodiments are within the scope of the invention wherein the flickers move (e.g., via motor or solenoid action) either as the tamp is still or the tamp moves upward.

A felt renewal brush is contoured to match the felt profile and can be located so that the felt passes near the brush when the tamp is raised. The brush can be itself raised periodically as the felt passes by to contact the felt and to brush it to prevent felt matting.

Figure 3:
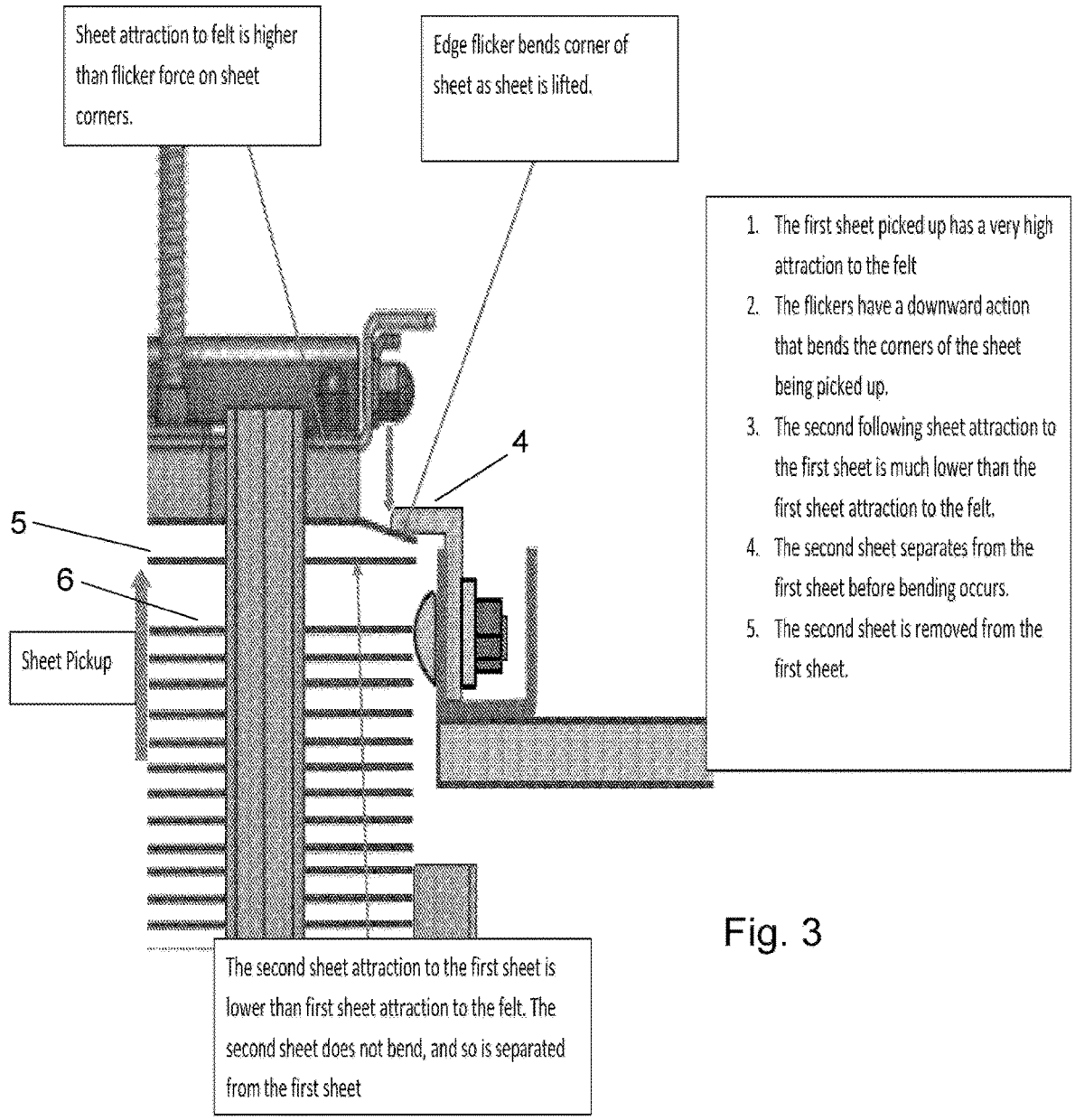
FIG. 3 shows a close-up view of one of the edge flickers.

FIG. 3 shows a close-up view of on of the edge flickers 4. It can be appreciated that the flicker 4 is bending the corner of the sheet being lifted 5. This corner bending pushes the second sheet 6 downward so that it remains on the stack.

Figure 4:
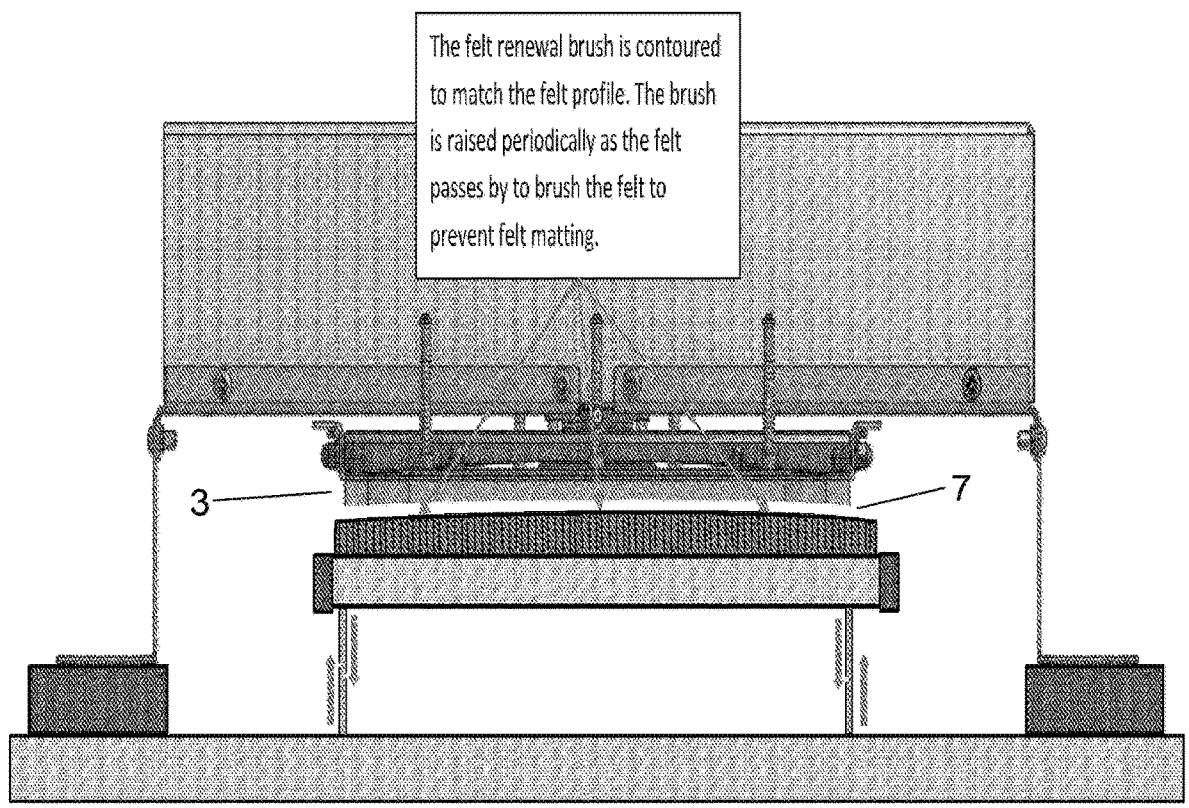
FIG. 4 shows an embodiment of the felt renewal brush.

FIG. 4 shows an embodiment of the felt renewal brush 7 which can be raised or moved into position to renew the felt tamp 3.

Figure 5:
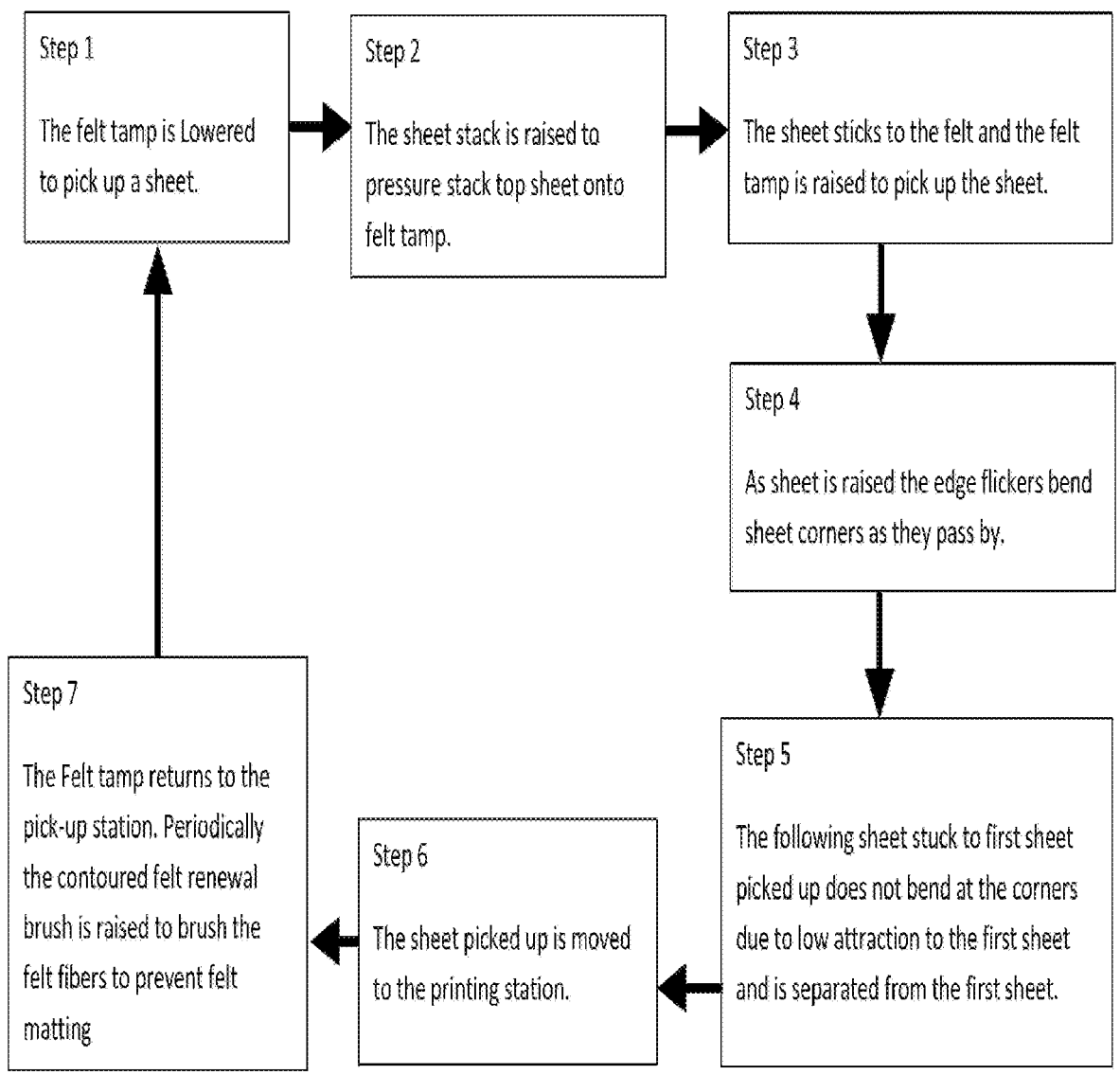
FIG. 5 is a flowchart of the pickup process.

FIG. 5 is a flowchart of the pickup process. As can be seen, the process is cyclic picking up sheet after sheet until the stack is exhausted. In a typical CBAM process, the exhausted stack may be renewed manually or via automatic mechanized transfer of a waiting stack. In step 1, the tamp is lowered to pick up a sheet. In step 2, the sheet stack is raised to meet the tamp. In Step 3, the top sheet on the stack sticks to the felt tamp. In step 4, the tamp begins to raise, and a set of edge flickers engage the corners of the top sheet as the tamp is being raised with the adhered top sheet. In step 5, the second sheet which is stuck to the first sheet does not bend at its corners, and the second sheet separates from the first sheet. In step 6, the picked up first sheet is moved to the next station in the assembly. In step 7, the tamp returns to the pickup station, and periodically, the renewal brush is raised to brush the felt fibers to prevent felt matting.

While the written description above uses the example of sheets as the substrate, the principles of the invention described herein have equal applicability to web or roll based feeding of substrate material.

Several descriptions and illustrations have been presented to aid in understanding the present invention. One with skill in the art will realize that numerous changes and variations may be made without departing from the spirit of the invention. Each of these changes and variations is within the scope of the present invention. For example, while the depicted flickers address the edges or corners of the top sheet, it is possible to use the principles described above to address a center region of the top sheet. It is also possible to use the principles described above to touch regions of the bottom sheet to the same effect as touching regions of the top sheet. Further, while porous sheets are described, relatively nonporous sheets can benefit from the process and system described here. These variations are considered within the scope of the invention of the appended claims, and are at least equivalent to them.

We claim:

1. A method for preventing feed sheets from sticking together in a 3-D printer comprising:
   lowering a felt tamp onto a stack of feed sheets, each feed sheet having a central region and edges;
   positioning a plurality of edge flickers in positions to bend the edges of a top sheet downward as the felt tamp lifts the top sheet upward;
   lifting the top sheet off the stack of feed sheets with the felt tamp;
   further comprising brushing the felt tamp periodically with a brush to prevent fiber matting;
   wherein, a second sheet on the stack of feed sheets does not adhere to the top sheet as the top sheet is lifted by the felt tamp because of the bent edges of the top sheet.

2. The method of claim 1, wherein the brush has a shape contoured to match the felt tamp.

3. The method of claim 1, wherein the brush can be raised or lowered.

4. A sheet feeder apparatus for a composite-based additive manufacturing (CBAM) system comprising:
   a frame constructed to contain a stack of substrate sheets;
   a movable tamp located above the frame that can be lowered to contact the top one of the stack of substrate sheets, said tamp having a felt bottom surface configured to adhere to a topmost substrate sheet upon contact;
   a plurality of edge flickers protruding above corners of said topmost substrate sheet;
   further comprising a brush constructed to periodically brush the tamp to prevent fiber matting;
   wherein, when the tamp is raised, the edge flickers bend the corners of the topmost substrate sheet downward causing any sheets below said topmost sheet adhering to the topmost sheet to separate from the topmost sheet.

5. The sheet feeder apparatus of claim 2, further comprising a brush constructed to periodically brush the felt tamp to prevent fiber matting.

* * * * *